United States Patent Office 3,652,640
Patented Mar. 28, 1972

3,652,640

OXYHALOGENATED PROCESS

Francis T. Wadsworth, Trenton, and Jack Newcombe, Trenton, N.J., and Floyd T. Welch, Sulphur, La., assignors to Cities Service Company, New York, N.Y.

No Drawing. Filed July 9, 1968, Ser. No. 750,418
Int. Cl. C07c *121/30*
U.S. Cl. 260—465.7 4 Claims

ABSTRACT OF THE DISCLOSURE

Processes are described for producing α-halogenated derivatives of aliphatic compounds containing an electron withdrawing functional group, α,β-ethylenic unsaturation and at least one α-hydrogen radical by contacting the aliphatic compound with oxygen and a hydrogen halide in the presence of an oxyhalogenation catalyst. Illustrations show the production of high yields of α-chloro-acrylonitrile by passing a mixture of acrylonitrile, air and hydrogen chloride through a heated bed of a supported copper oxychlorination catalyst.

BACKGROUND OF THE INVENTION

Field of the invention

This invention relates to the production of aliphatic compounds containing an electron withdrawing functional group, α,β-ethylenic unsaturation and an α-halogen radical (e.g. α-chloro-acrylonitrile) by the catalytic oxyhalogenation of the corresponding α-hydro compound (e.g. acrylonitrile).

Description of the prior art

It is well known that hydrogen substitution in aliphatic compounds containing conjugation of a carbon to carbon double bond and an electron withdrawing functional group occurs preferentially on the β-carbon atom. For example, when acrylonitrile is chlorinated in the absence of a catalyst, little if any α-chloro-acrylonitrile can be found in the product which is predominantly β-chloropropionitrile and trichloropropionitrile. A somewhat improved process is described in U.S. Pat. 2,231,363 wherein high reaction temperatures and an active carbon catalyst are employed in the chlorination of acrylonitrile to obtain a recoverable yield of α-chloro-acrylonitrile. While this procedure is effective in effecting α-chlorination, the maximum yields obtainable amount to 40% or less based on the reacted acrylonitrile with the remainder of the reacted acrylonitrile being converted to β-chloro-propionitrile and trichloropropionitrile.

Because of the aforementioned low product yields from these single step direct chlorination procedures, α-chloroacrylonitrile is generally produced by a two step method involving chlorination of acrylonitrile to form α,β-dichloropropionitrile and dehydrochlorination of this material. A typical two step procedure of this type is described in U.S. Pat. 2,384,889. A major disadvantage of such procedure is the fact that the large quantities of by product hydrogen chloride which are produced cannot be directly recycled.

SUMMARY

It is an object of this invention to provide a process for obtaining high yields of α-halo, α-β-ethylenically unsaturated derivatives of aliphatic compounds having an electron withdrawing functional group. It is a further object of this invention to provide a simple one step method for obtaining these products with improved utilization of the halogenating agent. It has now been found that these and other objects, which will be obvious to those skilled in the art, can be achieved by operation in accordance with the instant invention.

Broadly, this invention involves a process for substituting a halogen radical for an α-hydrogen radical in an aliphatic compound having an ethylenic double bond conjugated with an electron withdrawing functional group by contacting the aliphatic compound with either elemental halogen or a mixture of oxygen and a hydrogen halide or halogen in the presence of an oxyhalogenation catalyst and recovering the α-halogenated product.

DESCRIPTION OF THE PREFERRED EMBODIMENTS

While the process of this invention is operable with elemental halogen in the presence or absence of oxygen, the use of an oxygen containing feed mixture, especially one in which a hydrogen halide such as hydrogen chloride or hydrogen bromide is the major source of halogen, is greatly preferred for reasons of economy and efficiency. In a continuous operation, the hydrogen halide in the fresh feed may advantageously be augmented with hydrogen halide or halogen that is recovered from the product stream and recycled.

The reaction may be conducted at any temperature from about 150° C. to about 600° C. or higher. The optimum reaction temperature is above the boiling point of the reactants and varies somewhat depending on the nature and proportions of the feed and the nature of catalyst. It seldom, however, is advantageous to operate outside the preferred temperature range of from about 200° C. to about 400° C.

Similarly, the reaction may be conducted under a wide range of pressure conditions from below about 0.1 atmosphere to about 10 atmospheres or higher. While variations in pressure have little influence on product distribution, the use of pressures of 1 atmosphere or higher, particularly at high temperatures, is generally desirable in order to maintain a substantial quantity of the reactants in contact with the catalyst and thereby obtain a high reactor throughput and efficient utilization of the catalyst.

Any oxyhalogenation catalyst is suitable for use in this process. These catalysts typically contain metallic copper, iron, nickel or a rare earth or a salt thereof, such as the chlorides, oxides, oxychlorides and nitrates, which is advantageously deposited on a porous absorptive carrier, such as diatomaceous earth, silicate clay, silica gel, pumice or alumina. The use of copper or copper salt containing catalysts, especially those containing from about 0.1 to about 10 weight percent copper, is preferred. These well known catalysts, which are widely used in the Deacon process for the oxidation of hydrogen chloride as well as the oxychlorination of diverse hydrocarbons, may be employed in either a fixed or fluidized bed. Catalyst particle size and shape is not a critical factor in determining product distribution; however, it is generally advantageous for maximum reactor utilization to employ small particles, e.g. 2 to 10 mesh (Tyler Standard) in fixed bed operations or up to about 200 mesh or smaller in fluidized beds, in order to provide a large surface for contact with the reactants.

Aliphatic compounds which are suitable for use in the process of the instant invention are, as indicated above, those which have an ethylenic double bond conjugated with an electron withdrawing functional group and which have at least one hydrogen radical on the vinylene carbon atom adjacent to this electron withdrawing group; i.e. the α-carbon atom. Typical of these suitable compounds are those of the formula

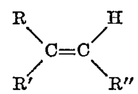

wherein R and R' are each hydrogen or organic radicals and R'' is an electron withdrawing group such as —CN, —COR, —$CONR_2$, —COOR, —NO, —$NO_2$, —$SO_2R$, —$SO_2OR$, —SOR, —CSR, —NCO and —$CR=CR_2$. Although any such aliphatic compound in which R or R' is an organic radical containing reactive functional groups can be employed, it is preferable that each be either hydrogen or a saturated hydrocarbyl radical when a monohalogenated product is desired. Lower alkeny compounds in which the carbon to carbon double bond is conjugated with a carbonyl or cyanide group, such as acrylonitrile, acrolein, acrylic acid and ethyl acrylate, represent an especially preferred class of these materials. Other useful compounds include acrylamide, N,N-dimethyl acrylamide, methyl vinyl ketone, divinyl sulfoxide, vinylsulfonic acid, vinyl isocyanate, 2-heptenenitrile, 1,3-pentadiene, nitroethylene, maleic anhydride, maleic acid, fumaric acid, dimethyl maleate, 2-ethylhexyl acrylate, benzyl acrylate, β-propylacrylic acid and β-vinylacrylic acid.

Monohalogenated product may be obtained by contacting the reactants in any proportions with the catalyst for from less than about 0.1 second to as much as an hour or more. In conducting the process of this invention it is, however, generally advantageous to contact the catalyst with a preheated reactant mixture containing from about 0.1 to about 5 moles of oxygen and from about 0.1 to about 5 moles of hydrogen halide (or from about 0.05 to about 2.5 moles of elemental halogen) per mole of unsaturated aliphatic feed for less than about one minute. Outstanding results can be obtained when the reactant mixture contains unsaturated aliphatic compound, oxygen and hydrogen halide or elemental halogen (calculated as hydrogen halide) in a mole ratio of 1:0.5–2. 0:0.5–2.0, and one maintains an average contact time between this mixture and the catalyst of from about 0.5 second to about 40 seconds, preferably from about 2 to about 20 seconds.

While it is not essential to employ diluents in the reaction of this invention, the presence of inert gases is not harmful and may be desirable for reasons of economics and safety. Highly satisfactory results can be obtained when air or oxygen enriched air is employed as the source of oxygen.

The following examples, which were conducted in accordance with the instant invention, illustrate the simplicity of the process, the high yields of desired product and the high utilization level of raw materials which can be achieved through its employement.

EXAMPLE 1

An electrically heated brass jacketed stainless steel tubular reactor having an inside diameter of ½" and a height of 52" is charged with 100 cubic centimeters of 6 to 8 mesh (Tyler Standard) irregularly shaped particles of a 5 weight percent copper on sodium aluminate catalyst, which is prepared by wetting the sodium aluminate with a methanol solution of cuprous chloride and drying at 116° C. for eight hours. The remainder of the reactor space above the catalyst is then filled with 6 to 8 mesh (Tyler Standard) spheres of silicon carbide and the reactor is heated to 3000° C. Acrylonitrile, hydrogen chloride and air are introduced into the top of the reactor at the following rates (NTP): acrylonitrile, 10 milliliters per hour; hydrogen chloride, 3.36 liters per hour; and air, 8.4 liters per hour. The mixture of reactants, which contains approximately equal molar quantities of acrylonitrile, hydrogen chloride and oxygen, is preheated to 300° C. while passing downward through the silicon carbide particles before reaching the catalyst. Average residence time in the catalyst bed is about 11 seconds. Effluent from the bottom of the reactor is passed through two icewater condensers where liquids are collected. These liquids are diluted with petroleum ether and then extracted twice with water. The petroleum ether phase is then washed with aqueous sodium bicarbonate and the ether phase is separated and steam distilled to remove the ether. Analysis of the liquid products shows that the conversion of the acrylonitrile is 52% with an 82.7% selectivity to α-chloro-acrylonitrile.

EXAMPLE 2

The procedure of the preceding example is repeated except that broken brick is employed in place of silicon carbide to preheat the reactants. The temperature of these reactants at the point of entry into the catalyst bed is 270° C. Acrylonitrile conversion is 49% with an α-chloro-acrylonitrile selectivity equivalent to that of the preceding example.

EXAMPLE 3

The procedure of Example 1 is repeated except that the catalyst is 6 to 8 mesh (Tyler Standard) irregularly shaped particles of a 5% copper on activated alumina catalyst, which is prepared by impregnating the alumina with aqueous cuprous chloride and drying at 116° C. for eight hours. The α-chloro-acrylonitrile selectivity is over 50%.

EXAMPLE 4

The procedure of Example 1 is repeated except that the acrylonitrile is replaced in successive runs by methyl acrylate, acrolein and 1,3-butadiene which are introduced at the rate of 0.15 mole per hour. Substantial quantities of methyl α-chloro-acrylate, α-chloro-acrolein and chloroprene are identified in the liquid product.

EXAMPLE 5

The procedure of Example 1 is repeated except that the acrylonitrile is replaced by divinyl sulfone which is introduced at the rate of 0.08 mole per hour. A substantial quantity of α,α'-dichloro-divinyl sulfone is identified in the product.

EXAMPLE 6

The procedure of Example 1 is repeated except that chlorine and unreacted hydrogen chloride and acrylonitrile are recovered from the reactor effluent and recycled. Fresh feed rates are adjusted downward so that the total fresh and recycled acrylonitrile entering the reactor is 10 milliliters per hour and the total fresh and recycled hydrogen chloride and recovered chlorine is equivalent to about 3.3 to 3.4 liters per hour of hydrogen chloride. After one hour of recycle operation, α-chloro-acrylonitrile selectivity is over 80% with essentially total conversion of the fresh acrylonitrile and hydrogen chloride feeds.

We claim:

1. A substitution chlorination process which comprises contacting one molar proportion of acrylonitrile with a mixture of about 0.1–5 molar proportions of oxygen and about 0.1–5 molar proportions of hydrogen chloride for about 1–30 seconds at about 200–400° C. and about 0.1–10 atmospheres of pressure in the presence of a metal catalyst of the group consisting of copper, iron, nickel, rare earth metals, and the chlorides, oxides, oxychlorides, and nitrates thereof to substitute chlorine for the alpha-hydrogen, and recovering the resultant alpha-chloroacrylonitrile.

2. The process of claim 1 wherein the source of the oxygen is air.

3. The process of claim 2 wherein the catalyst is cuprous chloride.

4. A continuous process for the production of alpha-chloroacrylonitrile which comprises passing a mixture of acrylonitrile, air, and hydrogen chloride through a bed of sodium aluminate-supported cuprous chloride catalyst containing about 0.1–10% by weight of copper at a rate such that the average contact time between the mixture of reactants and the catalyst is about 1–30 seconds, the mixture of reactants containing about 0.5–2 mols of oxygen and about 0.5–2 mols of hydrogen chloride per mol of acrylonitrile, maintaining the bed of catalyst at a temperature of about 200–400° C. under a pressure of about 0.1–10 atmospheres, and recovering alpha-chloroacrylonitrile.

References Cited

UNITED STATES PATENTS

| | | | |
|---|---|---|---|
| 2,374,923 | 5/1945 | Cass | 260—654 A |
| 2,379,414 | 7/1945 | Cass | 260—654 A |
| 2,399,488 | 4/1946 | Hearne | 260—659 A |
| 2,894,936 | 7/1959 | Benson | 260—78.4 R |
| 3,030,408 | 4/1962 | Inman et al. | 260—465.4 X |
| 3,050,568 | 8/1962 | Arganbright | 260—654 A |
| 3,055,955 | 9/1962 | Hodges | 260—659 A |
| 3,214,482 | 10/1965 | Caropreso et al. | 260—659 A |
| 3,510,532 | 5/1970 | Caropreso et al. | 260—465.7 X |

FOREIGN PATENTS

| | | | |
|---|---|---|---|
| 803,406 | 10/1958 | Great Britain | 260—486 |

OTHER REFERENCES

Cram and Hammond, "Organic Chemistry," 2nd ed., McGraw-Hill, N.Y. (1964), p. 292; copy in Sci. Lib.

Kominami, Journal of Japan Petroleum Institute, Apr. 2, 1966, pages 99 (title page), 100 and 104 of original article relied on and pages 1 and 2 of translation relied on. (Copy of all of these 5 pages found in 260–659A.)

JOSEPH P. BRUST, Primary Examiner

U.S. Cl. X.R.

260—346.8, 453, 485, 486, 513, 537, 539, 561, 593, 601, 607, 644, 654 A, 655, 659 A